Figure 1:
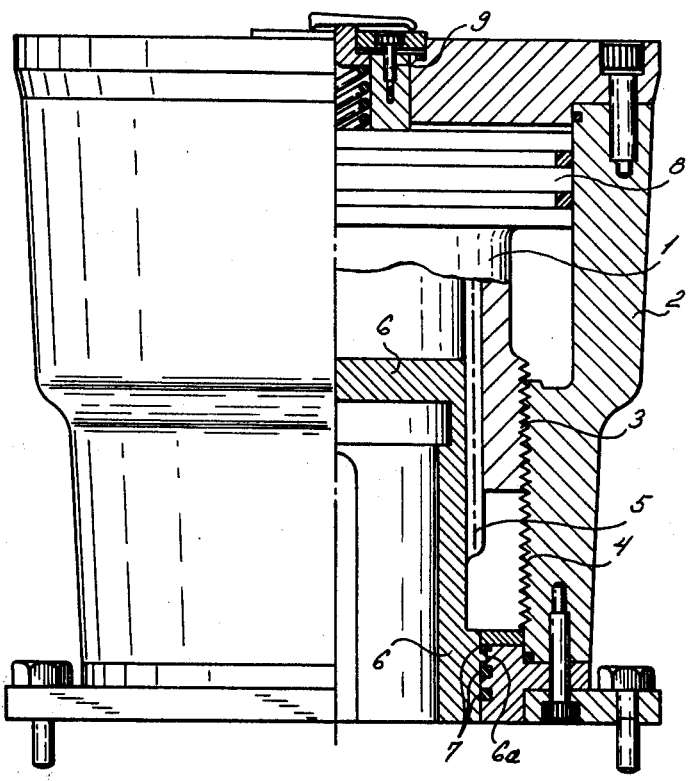

United States Patent [19]

Sondergaard

[11] 3,977,305
[45] Aug. 31, 1976

[54] OPERATING MECHANISM FOR TURNING AN AXLE END

[75] Inventor: Jorgen Sondergaard, Naestved, Denmark

[73] Assignee: C.O. Hansen MASKINFABRIK af 1970 A/S, Naestved, Denmark

[22] Filed: Nov. 21, 1973

[21] Appl. No.: 418,155

Related U.S. Application Data

[63] Continuation of Ser. No. 179,668, Sept. 13, 1971, abandoned.

[52] U.S. Cl. .................................. 92/31; 74/89.15; 92/113; 92/136; 251/58
[51] Int. Cl.² .......................................... F01B 3/00
[58] Field of Search ................ 92/31, 113, 136, 33; 74/89.15; 251/58

[56] References Cited
UNITED STATES PATENTS

| | | | |
|---|---|---|---|
| 1,005,763 | 10/1911 | Adams | 92/31 X |
| 2,918,799 | 12/1959 | Geyer | 92/113 X |
| 2,948,263 | 8/1960 | Royer | 92/31 X |
| 2,959,064 | 11/1960 | Geyer et al. | 74/89.15 X |
| 2,998,805 | 9/1961 | Usab | 92/33 X |
| 3,078,065 | 2/1963 | Vickery | 92/33 X |
| 3,213,923 | 10/1965 | Richter | 92/33 X |
| 3,319,925 | 5/1967 | Koichikojima et al. | 92/31 X |
| 3,329,069 | 7/1967 | Feroy | 92/33 |
| 3,450,382 | 6/1969 | Calim | 251/58 |
| 3,530,769 | 9/1970 | Gurevich | 92/31 |

FOREIGN PATENTS OR APPLICATIONS

1,426,525   5/1969   Germany ............................. 92/33

Primary Examiner—Marton P. Schwadron
Assistant Examiner—Abraham Hershkovitz
Attorney, Agent, or Firm—Nolte and Nolte

[57] ABSTRACT

An operating mechanism for turning a butterfly valve axle or similar device has a piston/cylinder unit of which the piston is coupled to the axle and is provided with screw-thread means producing rotation of the axle as the piston is reciprocated in the cylinder. The arrangement of the piston/cylinder unit and coupling means is such that a longitudinally compact mechanism is achieved.

2 Claims, 1 Drawing Figure

OPERATING MECHANISM FOR TURNING AN AXLE END

This is a continuation, of application Ser. No. 179,668 filed 9/13/71, now abandoned.

The invention relates to an operating mechanism for turning an axle end, preferably for a swivel damper (butterfly valve), and comprising a piston-cylinder-mechanism operated by a pressure medium, a piston member thereof being axially displaceable in the cylinder and unturnably connected with a coupling part for the axle end, the piston member and the cylinder having mutually cooperating screw means that impart a screwing motion to the piston member when the latter is displaced, the said screw means being arranged in a housing for the piston-cylinder-mechanism, the coupling part projecting into the cylinder through a pressure medium tight sealing means, the piston member being hollow and surrounding the coupling part.

From German Pat. No. 1,121,475 a mechanism of the said type is known. This known mechanism has an axle end projecting from one end of the cylinder. Hereby it is difficult to connect the mechanism with for instance a butterfly valve that has a projecting axle end.

The mechanism according to the present invention is characterized in that the coupling part is hollow and is formed for the insertion of an axle end. Hereby it is easy to connect the mechanism with for instance a butterfly valve having a projecting axle end.

The coupling part and the piston member may be connected with each other by means of axial teeth. Hereby it is easy to make an angular adjustment during the mounting of the mechanism on a butterfly valve.

The invention will be explained in more detail in the following under reference to the drawing showing a partial longitudinal sectional view of an embodiment of the operating mechanism according to the invention. The operating mechanism shown in the drawing has a piston means 1 with a piston 8 that is displaceable in a cylinder 2. At its lower portion the piston means has a non-self-locking screw thread 3 that cooperates with a corresponding screw thread 4 on the inner surface of the cylinder. The piston means is hollow and has an axially grooved interior surface in which fits a correspondingly grooved surface 5 of a coupling part 6 that is inserted in the cylinder housing through a liquid tight gasket 7, the grooves of said surfaces forming axial teeth. The matching groove surfaces allow relative axial displacement of the piston means and coupling parts.

When pressure medium is led to the cylinder 2 above or below the piston 8, the latter will move upwards or downwards in the cylinder and thereby be turned on account of the collaboration between the screw threads 3 and 4, and the resulting turning motion will be transmitted to the coupling part 6 by means of the grooved surface 5. The turning angle corresponding to one of the piston's end positions can be adjusted by means of a screw means 9 in the cylinder's upper end bottom.

To allow rotational movement of the coupling part relatively to the cylinder and for restraining the coupling part against axial movement relative to the cylinder, an annular flange 6a is formed on the coupling part and is disposed in an adjacent annular groove in the cylinder.

It will be understood that the operating mechanism according to the invention may be altered in many ways to adapt it for different purposes. Instead of the grooved surface 5 on the coupling part 6, a screw thread may be used that cooperates with a corresponding screw thread on the inner surface of the piston means, and by making a suitable choice of the pitch and the direction of this screw thread relative to the outer screw thread on the piston means, the proportion between the turning forces transmitted to the axle end and the latter's turning angle may be varied over a very large range. However, this may also be achieved by means of an axially grooved surface. An advantage of the axially grooved surface is that the axle bearing only has to absorb the forces resulting from the friction between the piston means and the coupling part.

What is claimed is:

1. An operating mechanism for swivelling an axle end such as that of a butterfly valve, and comprising a piston-cylinder-mechanism operated by a pressure medium, a piston member thereof being axially displaceable in the cylinder by the pressure medium, means directly connecting said piston member with a coupling part for rotational movement therewith and for relative axial displacement with respect thereto, said means connecting said piston member and coupling part comprising axially extending teeth on said piston member engaging corresponding axially extending teeth on said coupling part whereby relative movement between said piston member and coupling parts is limited to axial movement, the piston member and the cylinder having mutually cooperating screw means that impart opposite rotational motions to the piston member when the latter is displaced in respective opposite axial directions, the coupling part projecting into the cylinder through a pressure medium tight sealing means, the piston member being hollow and surrounding the coupling part, the coupling part being hollow and constituting means for receiving an axle end and for driving the same, said screw means being longitudinally overlapped with said coupling part and means mounting said coupling part directly to said cylinder for rotational movement only and for restraining the same against axial movement, said means mounting said coupling part to said cylinder comprising an abutment surface on said coupling part and a corresponding surface on said cylinder.

2. An operating mechanism for turning an axle end comprising a pressure medium operated double acting piston-cylinder unit, the piston member and cylinder of said unit being operatively interconnected by longitudinally extending screw means said screw means being operative to impart a rotary motion to the piston member as said member is longitudinally displaced on the admission of pressure medium to said cylinder, a longitudinally extending coupling element projecting into said cylinder, seal means preventing pressure medium leakage between said coupling element and cylinder, said coupling element being directly connected to the piston member by means imparting rotary motion of said piston member to said coupling member, said means imparting rotary motion comprising axially extending teeth on said piston member engaging correspondingly axially extending teeth of said coupling member, said coupling element having a hollow opening at one end thereof for the reception of said axle end, said coupling element extending longitudinally inwardly of said cylinder beyond the adjacent end region of said screw means, said open end of said coupling element being substantially co-terminous with the end of said cylinder and means are provided for mounting said coupling element for rotational motion only and for restraining axial motion thereof, said last mentioned means comprising an abutment surface on said coupling element cooperating with a corresponding surface on said cylinder.

* * * * *